US010185050B2

(12) United States Patent
Tolman et al.

(10) Patent No.: US 10,185,050 B2
(45) Date of Patent: Jan. 22, 2019

(54) COMPENSATED TRANSMIT ANTENNA FOR MWD RESISTIVITY TOOLS

(71) Applicant: Nabors Drilling Technologies USA, Inc., Houston, TX (US)

(72) Inventors: John Tolman, Humble, TX (US); John Zeigler, The Woodlands, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 0 days.

(21) Appl. No.: 15/231,194

(22) Filed: Aug. 8, 2016

(65) Prior Publication Data

US 2017/0045637 A1   Feb. 16, 2017

Related U.S. Application Data

(60) Provisional application No. 62/205,387, filed on Aug. 14, 2015.

(51) Int. Cl.
*G01V 3/30* (2006.01)

(52) U.S. Cl.
CPC ..................................... *G01V 3/30* (2013.01)

(58) Field of Classification Search
CPC .......... G01V 3/10; G01V 3/101; G01V 3/102; G01V 3/104; G01V 3/105; G01V 3/107; G01V 3/18; G01V 3/28; G01V 3/30
See application file for complete search history.

(56) References Cited

U.S. PATENT DOCUMENTS

| | | | | |
|---|---|---|---|---|
| 2,582,314 A | * | 1/1952 | Doll | G01V 3/28 324/339 |
| 3,890,563 A | * | 6/1975 | Dowling | G01V 3/28 324/340 |
| 6,586,939 B1 | * | 7/2003 | Fanini | G01V 3/28 324/339 |
| 2006/0192561 A1 | * | 8/2006 | Chesser | G01V 3/28 324/339 |
| 2010/0134113 A1 | * | 6/2010 | DePavia | G01V 3/28 324/346 |
| 2013/0249539 A1 | * | 9/2013 | Zibold | G01V 3/101 324/228 |
| 2014/0300351 A1 | * | 10/2014 | Hahl | G01V 3/107 324/259 |

* cited by examiner

*Primary Examiner* — David M Schindler
(74) *Attorney, Agent, or Firm* — Adolph Locklar

(57) ABSTRACT

A transmission assembly may include an electronics package comprising an RF generator, the electronics package having a first antenna output and a second antenna output. The transmission assembly may also include a transmission antenna formed from at least one transmission winding, the transmission antenna having a first end coupled to a first antenna output and a second end coupled to a second antenna output. In addition, the transmission assembly may include a compensation coil formed from at least one compensation winding, the compensation winding wound parallel with the transmission winding, the compensation coil having a first compensation end connected to the transmission antenna output and a second compensation end not coupled.

11 Claims, 2 Drawing Sheets

COMPENSATED TRANSMIT ANTENNA FOR MWD RESISTIVITY TOOLS

CROSS-REFERENCE TO RELATED APPLICATIONS

This application is a nonprovisional application which claims priority from U.S. provisional application No. 62/205,387, filed Aug. 14, 2015.

TECHNICAL FIELD/FIELD OF THE DISCLOSURE

The present disclosure relates generally to measurement while drilling (MWD) tools, and specifically to antennae for resistivity tools in MWD systems.

BACKGROUND OF THE DISCLOSURE

During a drilling operation, knowledge of the formation surrounding the wellbore may be desirable. Typically, a drill string will include a bottom hole assembly (BHA) which may include sensors positioned to track the progression of the wellbore or measure or log wellbore parameters. In some cases, the BHA may include a measurement while drilling (MWD) or logging while drilling (LWD) system to log downhole parameters. One such measurement is the resistivity of the surrounding formation.

A resistivity measurement measures the resistivity (inverse of conductivity) of the surrounding formation. Because hydrocarbons are generally nonconductive whereas water is, a resistivity measurement may allow a driller to determine the presence or absence of hydrocarbons in the surrounding formation. Resistivity measurements may be made by transmitting a radiofrequency signal into the surrounding formation and receiving the reflections. By measuring, for example, the attenuation and phase shift of the received signal, the resistivity of the surrounding formation may be calculated. However, typical transmission antenna arrangements may induce a portion of the signal into the tool body by capacitive coupling between the transmit antenna and the tool body. In order to alleviate this, complicated and bulky circuitry must be utilized to prevent such capacitive coupling. For example, transformers may be used to drive the antenna with a differential signal centered on the tool body's electric potential. However, the transformer takes up physical space and generates heat. Furthermore, a transformer may limit the ability of the transmission circuit to transmit on multiple frequencies.

SUMMARY

The present disclosure provides for a transmission assembly for a resistivity tool in a wellbore. The transmission assembly includes an electronics package comprising an RF generator, the electronics package having a first antenna output and a second antenna output. The transmission assembly also includes a transmission antenna formed from at least one transmission winding, the transmission antenna having a first end coupled to a first antenna output and a second end coupled to a second antenna output. In addition, the transmission assembly includes a compensation coil formed from at least one compensation winding, the compensation winding wound parallel with the transmission winding, the compensation coil having a first compensation end connected to the transmission antenna output and a second compensation end not coupled.

The present disclosure also includes a resistivity tool for use in a wellbore comprising. The resistivity tool includes a tool body, the tool body having a length, and an electronics package comprising an RF generator, the electronics package having a first antenna output and a second antenna output. The resistivity tool also includes a transmission antenna formed from at least one transmission winding, the transmission antenna having a first end coupled to a first antenna output and a second end coupled to a second antenna output. In addition, the resistivity tool includes a compensation coil formed from at least one compensation winding, the compensation winding wound parallel with the transmission winding, the compensation coil having a first compensation end connected to the transmission antenna output and a second compensation end not coupled. The resistivity tool further includes a receiver antenna positioned to receive electromagnetic signals transmitted by the transmission antenna through a formation.

The disclosure also provides for a method for measuring the resistivity of a formation. The method includes providing a resistivity tool. The resistivity tool includes a tool body, the tool body having a length, and an electronics package comprising an RF generator, the electronics package having a first antenna output and a second antenna output. The resistivity tool also includes a transmission antenna formed from at least one transmission winding, the transmission antenna having a first end coupled to a first antenna output and a second end coupled to a second antenna output. In addition, the resistivity tool includes a compensation coil formed from at least one compensation winding, the compensation winding wound parallel with the transmission winding, the compensation coil having a first compensation end connected to the transmission antenna output and a second compensation end not coupled. The resistivity tool further includes a receiver antenna positioned to receive electromagnetic signals transmitted by the transmission antenna through a formation. The method also includes generating a RF signal using the RF generator and transmitting the RF signal through the transmission antenna into the formation. In addition, the method includes forming an electromagnetic field with the transmission windings and receiving the RF signal at the receiver antenna.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
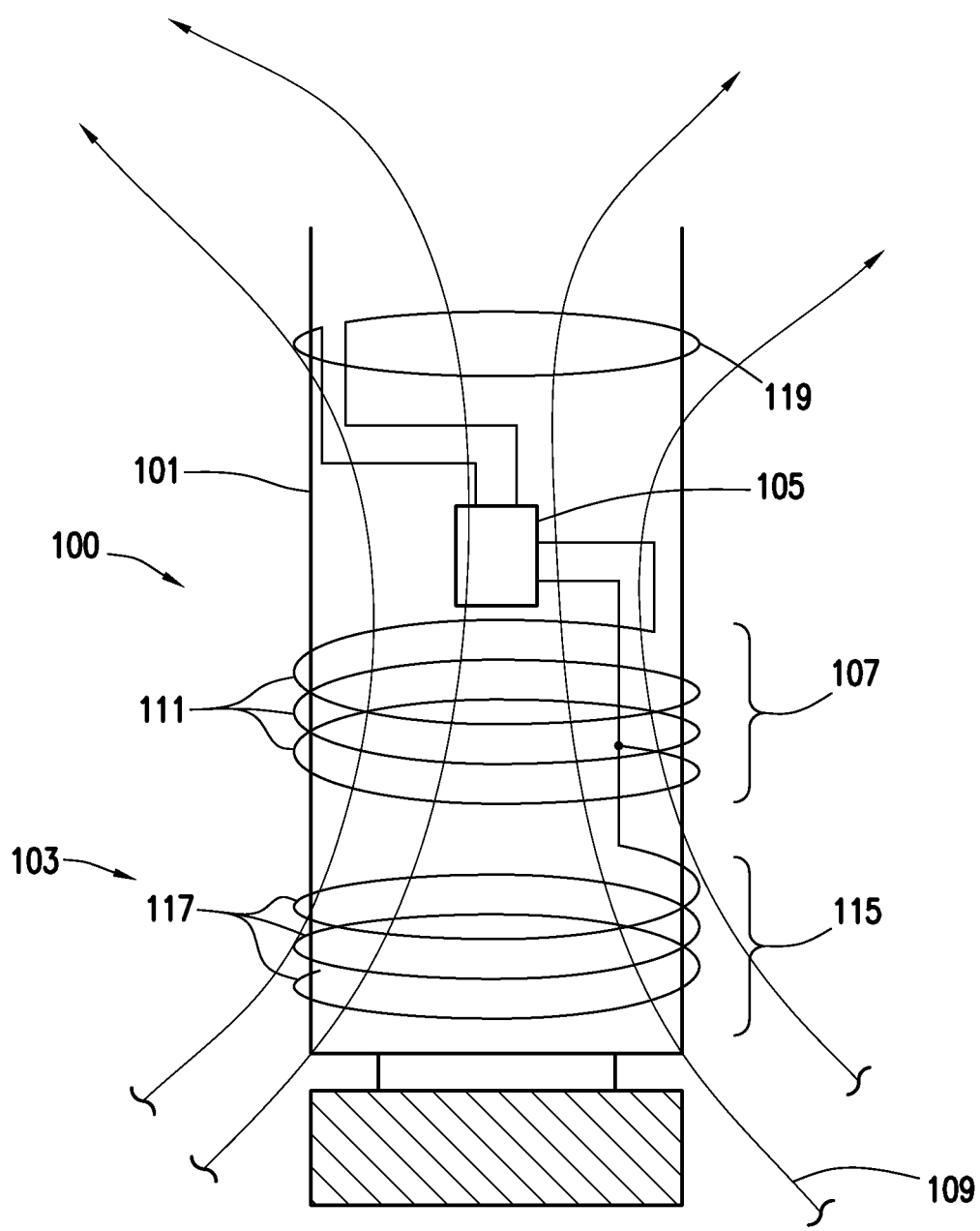
FIG. 1 depicts a downhole resistivity tool having an antenna consistent with at least one embodiment of the present disclosure positioned in a wellbore.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As depicted in FIG. 1, downhole resistivity tool 100 may include tool body 101. Tool body 101 may be a tubular sub of bottom hole assembly (BHA) 103. Downhole resistivity tool 100 need not be included as a part of BHA 103 and may instead be positioned elsewhere along a drilling string.

Downhole resistivity tool 100 may include electronics package 105. Electronics package 105 may be adapted to generate a signal to be transmitted by transmission antenna 107. Electronics package 105 may include a radio frequency generator ("RF generator") for generating the signal and an RF transmitter having a first antenna output 121a and a second antenna output 121b. The signal may be transmitted by the RF transmitter as an electromagnetic signal shown in FIG. 1 by field lines 109 through transmission antenna 107, for instance, into a formation. Transmission antenna 107 may be formed from one or more transmission windings 111, such as one or more wire windings, positioned in tool body 101. In some embodiments, as depicted in FIG. 1, transmission windings 111 may be oriented in a plane orthogonal or generally orthogonal to the length of tool body 101 such that the electromagnetic field produced thereby is induced parallel or generally parallel to the length of tool body 101. In other embodiments, transmission windings 111 may be oriented in other directions without deviating from the scope of this disclosure. Downhole resistivity tool 100 may further include compensation coil 115 positioned proximate to and aligned with transmission antenna 107. Compensation coil 115 may be formed from one or more compensation windings 117. Compensation windings 117 may be one or more wire windings. Compensation windings 117 may be wound parallel and proximate to transmission windings 111 such that the electromagnetic field of transmission antenna 107 may be inductively or capacitive coupled to compensation coil 115, thereby producing a voltage of opposite polarity as the voltage of transmission antenna 107. Compensation windings 117 may thus, for example and without limitation, reduce or eliminate electric signals from being capacitively coupled to tool body 101. Downhole resistivity tool 100 may further include one or more receiver antennae 119 positioned to receive the electromagnetic signal after being passed through the surrounding formation 10. By interpreting the attenuation and phase shift of the received signal, information about the resistivity of surrounding formation 10 may be determined.

Figure 2:
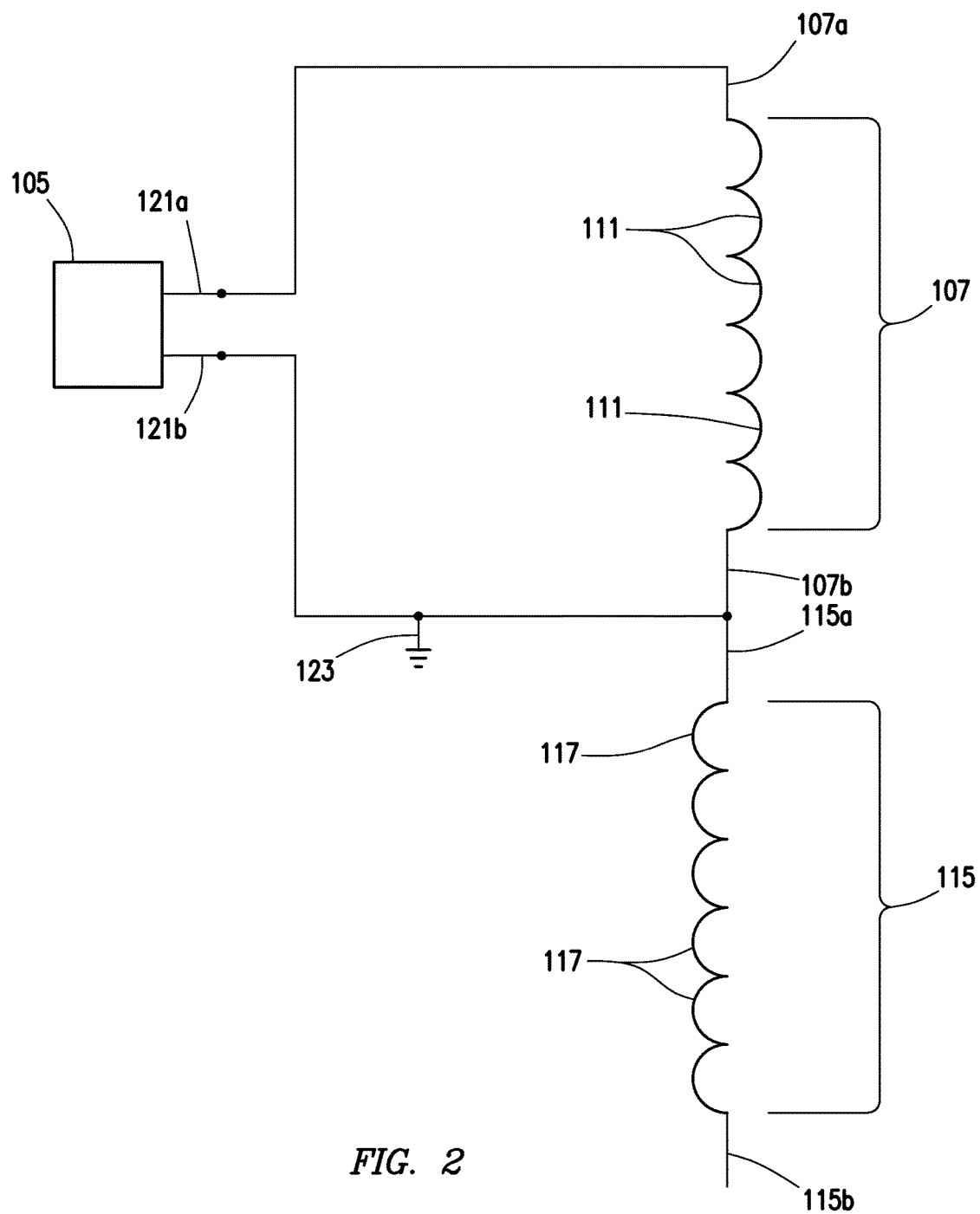
FIG. 2 depicts a schematic view of an antenna consistent with at least one embodiment of the present disclosure.

As depicted in FIG. 2, electronics package 105 may be coupled to transmission antenna 107. In some embodiments, transmission antenna 107 may have a first end 107a coupled to a first antenna output 121a of electronics package 105, and may have a second end 107b coupled to a second antenna output 121b of electronics package 105. Electronics package 105 may generate an electric potential between antenna outputs 121a, b such that electric current (i), generally in the form of an alternating current having a generally sinusoidal waveform, travels through transmission windings 111 of transmission antenna 107. In some embodiments, antenna outputs 121a, b may be coupled directly to transmission antenna 107. In some embodiments, antenna output 121b may be coupled to tool body 101, depicted as ground 123. In other embodiments, antenna output 121b is not coupled to tool body 101. In some embodiments, compensation coil 115 may have a first compensation end 115a coupled to antenna output 121b. Compensation coil 115 may also include a second compensation end 115b that is not coupled to any electronic source or ground. In such an arrangement, when transmission antenna 107 is inducing electromagnetic field, compensation coil 115, being parallel and in close proximity to transmission antenna 107, may have an electrical charge capactively coupled thereinto in a similar or the same value but opposite polarity as that of transmission antenna 107. Thus, the similar but opposite charges cancel, reducing or eliminating signal capacitively coupled to tool body 101 from transmission windings 111 because compensation windings 117 are of opposite polarity. Additionally, because second end 115b of compensation coil 115 is left uncoupled, no appreciable current travels therethrough, avoiding attenuation of the transmitted signal. As used therein, "transmission assembly" is the combination of electronics package 105, transmission 107, and compensation coil 115.

EXAMPLE

A transmission antenna was made with 3 windings around the body of a test tool body formed from aluminum. A receiver was placed 18 inches, 28 inches, and 48 inches away from the transmission antenna. The far/near receiver ratio was determined at each location. A compensation winding of 3 windings wound in the opposite direction from the transmission was added and the measurements were again taken. The results are in Table 1 below:

| Spacing | Model | Measured far/near No Compensation Coil | Measured far/near With Compensation Coil |
| --- | --- | --- | --- |
| 18 inch | 4.3 | 3.32 | 4.35 |
| 28 inch | 2.76 | 2.234 | 2.77 |
| 48 inch | 1.83 | 1.138 | 1.89 |

Without the compensation coil, the far/near receiver ratios were lower than the predicted ratio of a model, indicating additional signal reaching the receivers by capacitive coupling of the tool body. With the compensation coil, the measured ratios were similar to the predicted ratios indicating little to no additional signal reaching the receivers by capacitive coupling of the tool body.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A transmission assembly for a resistivity tool in a wellbore comprising:
    an electronics package comprising an RF transmitter, the RF transmitter adapted to transmit an electromagnetic signal through a transmission antenna, the electronics package having a first antenna output and a second antenna output;

the transmission antenna formed from at least one transmission winding, the transmission antenna having a first end coupled to the first antenna output and a second end coupled to the second antenna output; and a compensation coil formed from at least one compensation winding, the compensation winding wound parallel with the transmission winding, the compensation coil having a first compensation end connected to the second transmission antenna output and a second compensation end not connected to any electronic device or ground, wherein a voltage induced in the compensation coil by the transmission antenna is of opposite polarity to a voltage of the transmission antenna.

2. The transmission assembly of claim 1, wherein the compensation coil has the same number of windings as the transmission antenna.

3. The transmission assembly of claim 2, wherein each of the compensation coil and transmission antenna includes 3 windings.

4. The transmission assembly of claim 1, wherein the compensation coil is located proximate the transmission antenna.

5. A resistivity tool for use in a wellbore comprising:
a tool body, the tool body having a length;
an electronics package comprising an RF transmitter, the RF transmitter adapted to transmit an electromagnetic signal through a transmission antenna, the electronics package having a first antenna output and a second antenna output;
the transmission antenna formed from at least one transmission winding, the transmission antenna having a first end coupled to the first antenna output and a second end coupled to the second antenna output;
a compensation coil formed from at least one compensation winding, the compensation winding wound parallel with the transmission winding, the compensation coil having a first compensation end connected to the second transmission antenna output and, a second compensation end not connected to any electronic device or ground, wherein a voltage induced in the compensation coil by the transmission antenna is of opposite polarity to a voltage of the transmission antenna; and
a receiver antenna positioned to receive the electromagnetic signal transmitted by the transmission antenna through a formation.

6. The resistivity tool of claim 5, wherein each transmission winding of the transmission antenna is oriented in a plane orthogonal to the length of the tool body.

7. The resistivity tool of claim 5, wherein the tool body is a tubular sub of a BHA.

8. The resistivity tool of claim 5, wherein the second antenna output is coupled to the tool body.

9. A method for measuring a resistivity of a formation comprising:
providing a resistivity tool, the resistivity tool comprising:
a tool body, the tool body having a length;
an electronics package comprising an RF transmitter, the RF transmitter adapted to transmit an electromagnetic signal through a transmission antenna, the electronics package having a first antenna output and a second antenna output;
the transmission antenna formed from at least one transmission winding, the transmission antenna having a first end coupled to the first antenna output and a second end coupled to the second antenna output;
a compensation coil formed from at least one compensation winding, the compensation winding wound parallel with the transmission winding, the compensation coil having a first compensation end connected to the second transmission antenna output and a second compensation end not connected to any electronic device or ground, wherein a voltage induced in the compensation coil by the transmission antenna is of opposite polarity to a voltage of the transmission antenna; and
a receiver antenna positioned to receive electromagnetic signal transmitted by the transmission antenna through a formation;
generating the electromagnetic signal using an RF generator of the electronics package;
transmitting the electromagnetic signal, with the RF transmitter, through the transmission antenna into the formation, the transmitting of the electromagnetic signal though the transmission antenna forms an electromagnetic field, the transmitted RF signal also inducing an induced signal in the tool body;
reducing the induced signal by inducing in the compensation coil the voltage of opposite polarity to the voltage of the transmission antenna; and
receiving the electromagnetic signal with the receiver antenna.

10. The method of claim 9 wherein the formed electromagnetic field is parallel to the length of the tool body.

11. The method of claim 10 further comprising determining the resistivity of the formation by interpreting the attenuation and phase shift of the received the electromagnetic signal.

* * * * *